(12) United States Patent
Swanke et al.

(10) Patent No.: US 6,477,196 B1
(45) Date of Patent: Nov. 5, 2002

(54) DIRECT SEQUENCE SPREAD SPECTRUM COMMUNICATIONS RECEIVER AND METHOD FOR EFFICIENT NARROW-BAND SIGNAL EXCISION

(75) Inventors: Christopher J. Swanke; Steven L. White, both of Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/386,039

(22) Filed: Aug. 30, 1999

(51) Int. Cl.[7] .............................................. H04L 27/26
(52) U.S. Cl. ........................ 375/147; 375/148; 375/254; 375/278; 375/285; 375/346; 370/335; 370/342; 455/296; 455/306
(58) Field of Search ............................... 375/147, 148, 375/254, 278, 284, 285, 346, 350, 348; 455/311, 295, 296, 303, 306, 250.1; 370/320, 341, 342, 465, 335

(56) References Cited

U.S. PATENT DOCUMENTS 5,410,750 A * 4/1995 Cantwell et al. ............ 375/148
5,612,978 A * 3/1997 Blanchard et al. .......... 348/607
5,671,247 A * 9/1997 Souissi et al. ............... 375/144
5,907,624 A * 5/1999 Takada ....................... 381/94.2
5,974,101 A * 10/1999 Nago .......................... 375/148
6,009,129 A * 12/1999 Kenney et al. .............. 370/342
6,285,718 B1 * 9/2001 Reuven ....................... 375/257
6,370,133 B1 * 4/2002 Kang et al. .................. 370/342

* cited by examiner

Primary Examiner—Chi Pham
Assistant Examiner—Khanh Cong Tran
(74) Attorney, Agent, or Firm—Nathan O. Jensen; Kyle Eppele

(57) ABSTRACT

A method of excising one or more narrow-band interfering signals in a direct sequence spread spectrum receiver that performs a magnitude spectral analysis on baseband signals in a detection channel to determine which frequency bins in the spectral analysis output contain the interfering narrow-band signals by comparing the magnitude of the signals in the frequency bins to a threshold. The corrupted frequency bins are determined by the signal magnitudes exceeding the threshold and band reject filters excise the narrow-band signals in the signal channel in accordance with the corrupted frequency bins.

13 Claims, 4 Drawing Sheets

DIRECT SEQUENCE SPREAD SPECTRUM COMMUNICATIONS RECEIVER AND METHOD FOR EFFICIENT NARROW-BAND SIGNAL EXCISION

BACKGROUND OF THE INVENTION

This invention relates to communications systems and more specifically to direct sequence spread spectrum (DSSS) communications systems receivers.

Direct sequence spread spectrum communications system use wide over-the-air bandwidths. Conventional narrow-band signals may occupy the same frequencies used by the DSSS communications systems. To effectively recover the DSSS signal, the receiver in a DSSS system must excise the large narrow-band interfering signals from the receiver spectrum.

Various methods have been developed to excise large narrow-band signals using fast Fourier transforms (FFT). These methods result in circuitry that has high power consumption, occupies a large space, and has slow processing speed. For these reasons these methods are not easily implemented in small high-performance transceivers.

What is needed is a receiver employing a narrow-band signal excision function that effectively removes the interfering signals, has low power consumption, and is small in size.

SUMMARY OF THE INVENTION

A direct sequence spread spectrum (DSSS) communications receiver employing a narrow-band excision method is disclosed. The DSSS receiver comprises an antenna for receiving an input signal that may include a desired DSSS signal and one or more large narrow-band interfering signals. A down converter is connected to the antenna and includes an AGC controller for controlling the input signal level to the receiver with an AGC control signal to maintain a constant input signal level. The down converter also may include a mixer for down converting the input signal received from the AGC controller to an IF signal. An A/D converter may digitize the IF signal received from the mixer and a digital down converter may down convert the IF signal into an I/Q baseband signal. The A/D converter and the digital down converter may also be part of the down converter.

A detection channel connected to the digital down converter receives the I/Q baseband signal. The detection channel further comprises a spectral analysis function for performing a spectral analysis on a block of the I/Q baseband signal. A bin magnitude detector is connected to the spectral analysis function for detecting magnitudes of the I/Q baseband signal in frequency bins. An automatic gain control function is connected to the bin magnitude detector for generating the automatic gain control signal from the bin magnitude information in the frequency bins. A decision logic function connected to the bin magnitude detector compares the magnitudes of the I/Q baseband signal in the frequency bins to a threshold and determines corrupted frequency bin numbers containing one or more narrow-band interfering signals where the frequency bins contain signals exceeding the threshold.

A signal channel receives the I/Q baseband signal and further comprises frequency selectable band-reject filters to excise the one or more narrow-band interfering signals from the signal channel signal according to the corrupted frequency bin numbers. A demodulator subsequently demodulates the direct sequence spread spectrum signal in the signal channel.

It is an object of the present invention to provide a DSSS receiver that can excise one or more large interfering narrow-band signals.

It is an advantage of the present invention to provide a DSSS receiver that can excise one or more large interfering narrow-band signals using a simple magnitude spectral analysis and a bank of tunable band-reject filters.

It is a feature of the present invention to provide a DSSS receiver that can excise large one or more interfering narrow-band signals with circuitry that is small in size and has low power consumption.

These and other objects, features, and advantages are disclosed and claimed in the specification, figures, and claims of the present application.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
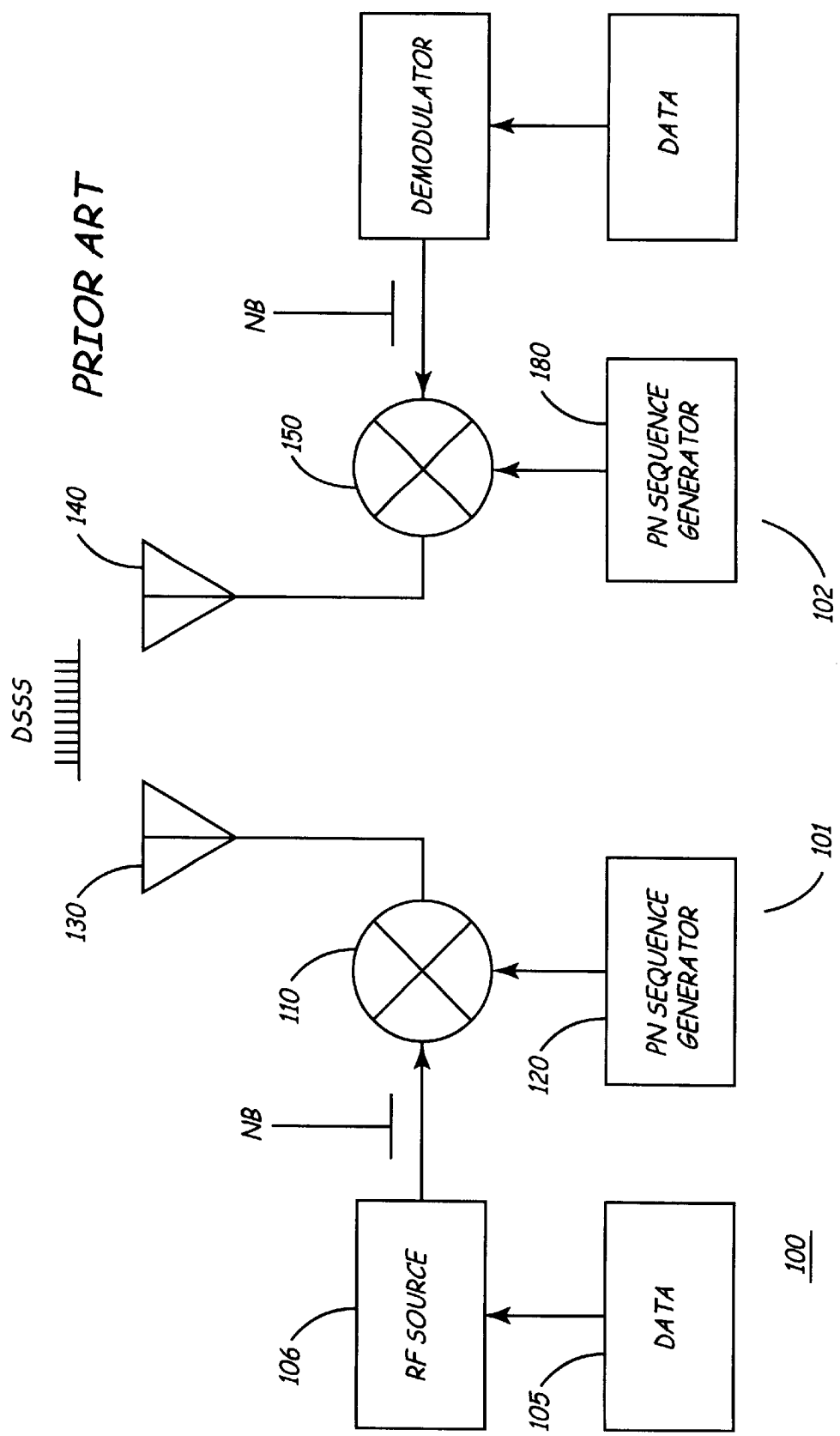
FIG. 1 is block diagram of a basic direct sequence spread spectrum communications system.

Direct sequence spread spectrum (DSSS) communications systems are known in the art. FIG. 1 shows a simplified DSSS communications system 100. In a DSSS system transmitter 101 a narrow-band modulated signal generated by a binary data source 105 controlling an RF source 106 is spread over a much wider bandwidth by mixing it (mixer 110) with another higher-frequency signal before being transmitted on antenna 130. This higher-frequency modulating signal is typically a pseudo random code from a pseudo noise generator 120 that phase modulates the signal. The DSSS signal is received by a DSSS receiver 102 at receive antenna 140. The received signal is mixed at mixer 150 with a signal from a pseudo noise generator 180. Pseudo noise generator 180 is identical to pseudo noise generator 120. The output of the mixer 150 is the narrow-band transmitter signal with the pseudo random code removed. The transmitter and receiver pseudo random codes must be synchronized for this to occur.

If a narrow-band interfering signal is present at the receiver antenna 140 and passed to the mixer 150, the narrow-band signal when mixed with the pseudo noise modulated local oscillator signal becomes a wide-band signal at the mixer output with reduced average power per hertz. In addition outputs from the mixer 150 such as receiver images or spurious responses may also be spread in a fashion similar to a narrow-band interfering signal. This processing in a DSSS receiver reduces the effect of an interfering narrow-band signal. However if the narrow-band interfering signal power is large, interference to the desired DSSS signal will occur in the receiver. Other methods such as narrow-band excision are needed to reduce the interference caused by large narrow-band signals in DSSS communications receivers.

Figure 2:
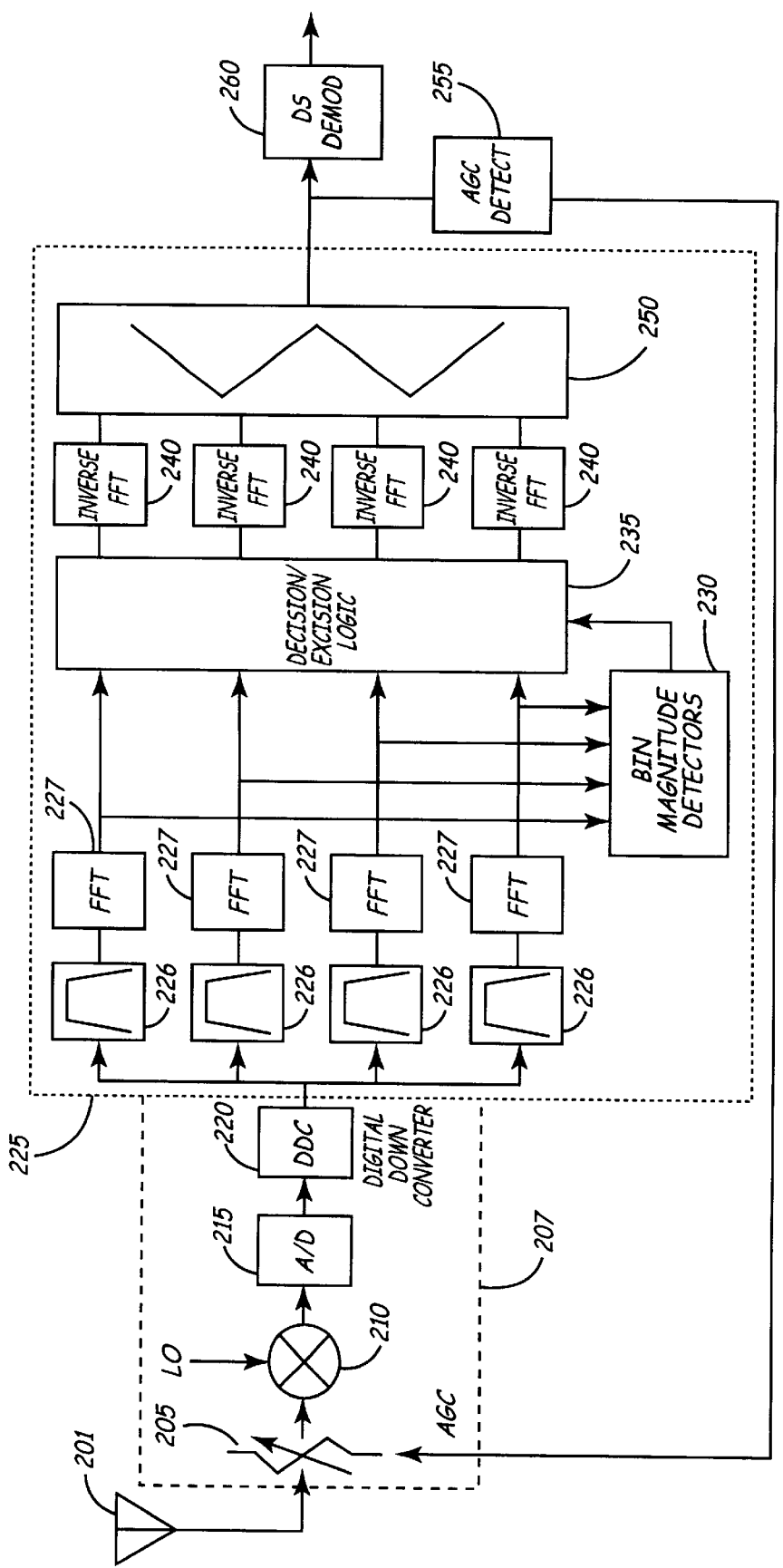
FIG. 2 is a block diagram of a direct sequence spread spectrum communications receiver employing a prior art method of narrow-band signal excision.

One prior art method for excision of one or more narrow-band interfering signals in DSSS receivers is shown in FIG. 2. In the DSSS receiver 200 of FIG. 2 DSSS and interfering narrow-band signals are received on antenna 201 and passed to automatic gain control (AGC) attenuator 205 in the down converter 207. The AGC attenuator 205 may be implemented as a resistive divider with an electronically variable element or some other means commonly used in the art. The down converter 207 may also contain mixer 210 that down converts the received signals with an injection from a local oscillator (not shown) to an IF frequency as is known in the art. The down converted received signals are then digitized by a conventional analog-to-digital converter (A/D) 215 and then further down converted by digital down converter 220 into a baseband signal that may be an I/Q signal. These functions may also be part of the down converter 207. The digital down converter 220 can be implemented by a digital quadrature mixer followed by several stages of digital filters. The digital quadrature mixer mixes the IF signal and a complex sinusoid generated by a numerically controlled oscillator (not shown). At this point the baseband signal contains the desired DSSS signal and the narrow-band interfering signals.

The baseband signal is then passed to the narrow-band signal excision function 225 for processing. In the narrow-band excision function, the signals are filtered by band-pass filters 226 and then processed by fast Fourier transforms (FFT) 227 to obtain the frequency spectrum. The FFT is known in the art and several integrated circuit chips are available to perform the function. Due to the wide-band nature of DSSS signals and the instantaneous dynamic range required to process both DSSS and narrow-band signals, the IF spectrum is typically sectioned and processed by multiple. FFTs 227. The outputs of the multiple FFTs 227 are in frequency bins with a bandwidth of some portion of the total IF bandwidth. The bandwidths of all the frequency bins of all FFTs 227 add up to the total IF bandwidth. The bin magnitude detector 230 compares the magnitude of the signals in each of the frequency bins. With narrow-band interfering signals, one or some number of the frequency bins (dependant on the bandwidth and the number of narrow-band interfering signals) will have a signal magnitude greater than the other frequency bins. The bin magnitude detector 230 identifies these frequency bins and then passes this information to the decision/excision logic 235 where the output of frequency bins with the large magnitude signals are inhibited thus excising the narrow-band interfering signals. The output of the decision/excision logic 235 is passed to inverse FFTs 240 and then to a summing function 250 where the desired DSSS signal is recreated. The desired DSSS signal is then passed to the direct sequence demodulator 260 for demodulation to obtain the desired signal with the narrow-band interfering signals removed.

With the approach shown in FIG. 2, multiple FFTs 227 are required in the signal path to perform the spectral analysis and excise the narrow-band interfering signals. The multiple FFTs have high power consumption, require a large amount of space, and have excessive latency that negatively impacts frequency-hopping performance in a hybrid DSSS system.

Figure 3:
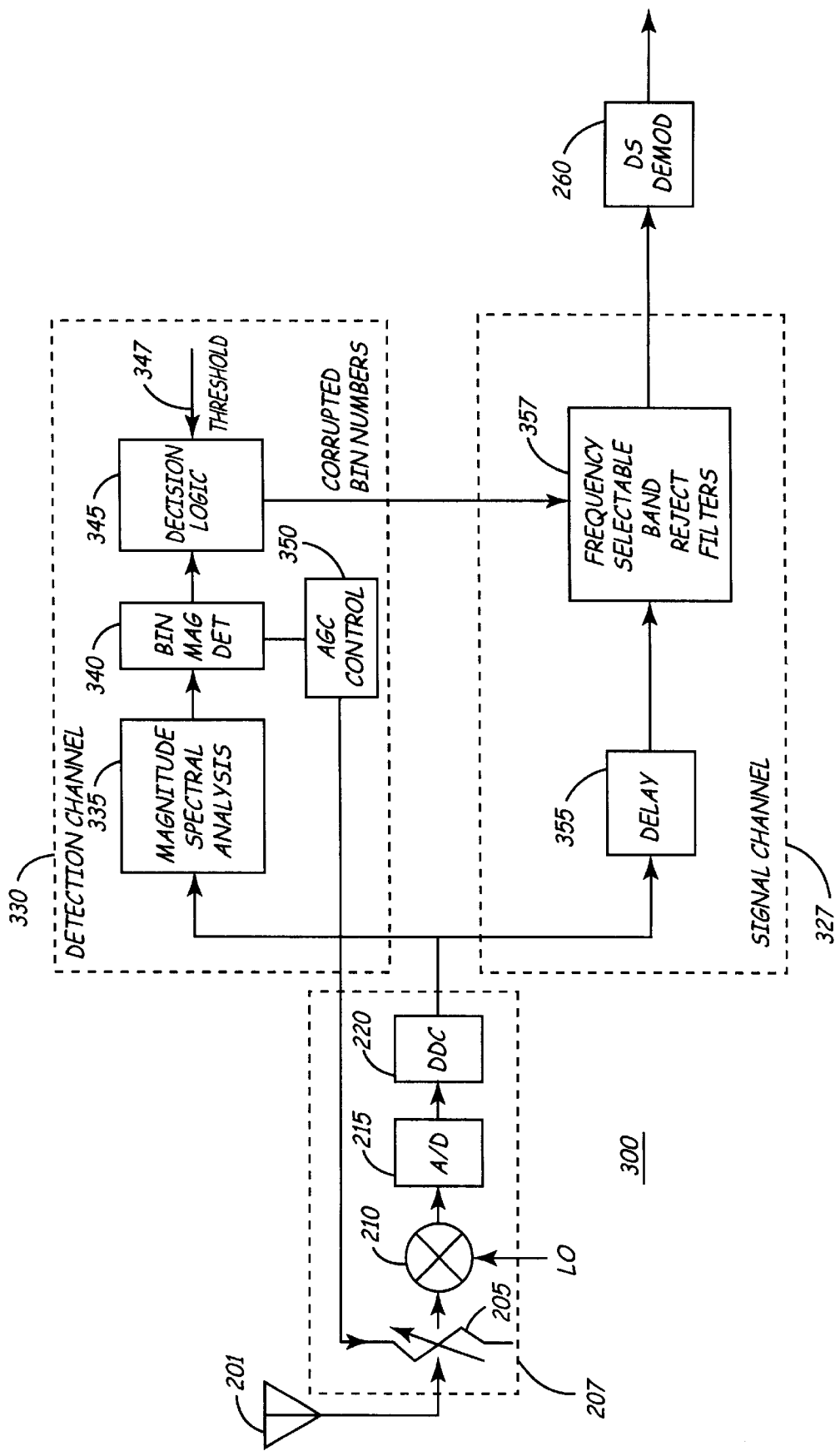
FIG. 3 is a block diagram of a direct sequence spread spectrum communications receiver employing the narrow-band signal excision method of the present invention.

The narrow-band excision method used in a DSSS communications system receiver 300 of the present invention is shown in FIG. 3. Several of the functions can be the same as the prior art receiver of FIG. 2 and the same identification numbers are used for these functions in FIG. 3. These same functions can be implemented in the same fashion as the prior art receiver in the receiver shown in FIG. 3. In the DSSS receiver 300 of FIG. 3, the desired DSSS signal and one or more narrow-band interfering signals are received on antenna 201 and passed to the down converter 207 containing the automatic gain control (AGC) attenuator 205. Also contained in the down converter 207 may be the mixer 210 for down converting the received input signal with an injection from a local oscillator (not shown) to an IF frequency as is known in the art. The down converted received signals may then digitized by analog-to-digital converter (A/D) 215 and then further down converted by digital down converter 220 into a baseband signal that may be an I/Q signal. The A/D converter 215 and the digital down converter 220 may also part be of the down converter 207. At this point the baseband signal may contain the desired DSSS signal and one or more narrow-band interfering signals.

The baseband signal is then passed to the narrow-band signal excision function for processing. In the narrow-band excision function of the present invention, the signals are processed in separate paths, a signal channel 327 and a detection channel 330. This approach simplifies both the detection (spectral analysis) and excision implementations. In the detection channel 330, a magnitude spectral analysis 335 operates on a block of received baseband signal samples to provide an indication of signal power versus frequency. Preserving the exact magnitude and phase is not critical since the signal will not be reconstructed as is done in the prior art. Spectral analysis is performed only occasionally because of the slow time varying nature of the narrow-band interfering signals. The magnitude spectral analysis 335 is performed by using a pseudo-real-time FFT followed by a bin magnitude computer to estimate the signal power spectrum. Note that the analysis is pseudo-real-time because blocks of data are gathered in real time yet analyzed in non-real-time. This leaves gaps between the analysis blocks to simplify the processing.

The spectral analysis output signals of the magnitude spectral analysis 335 are in frequency bins with a bandwidth of some portion of the total IF bandwidth. The bandwidths of all the frequency bins add up to the total IF bandwidth. The bin magnitude detector 340 determines the magnitude of the signals in each of the frequency bins. With narrow-band interfering signals, one or some small number of the frequency bins (dependent on the bandwidth and the number of narrow-band interfering signals) will have a signal magnitude greater than the other frequency bins. The bin magnitude detector 340 is implemented by computing the square root of the sum of the squares of the in-phase and quadrature components. This is done for each of the FFT bins.

The automatic gain control (AGC) 350 function utilizes the frequency bins in the bin magnitude detector 340 containing the lowest signal power (frequency bins containing no narrow-band signals) to maintain a constant desired signal level into the A/D converter 215 by adjusting the AGC attenuator 205 with an automatic gain control signal. This constant signal level allows a comparison of the spectral analysis data in the frequency bins to a threshold. The AGC control 350 is implemented by a standard loop filter.

The bin magnitude detector 340 outputs are passed to the decision logic 345 where the magnitudes of the signals in the frequency bins are compared to a threshold 347. The output of the decision logic 345 is an indication of corrupted frequency bins with a magnitude greater than the threshold 347 thus indicating the presence of one or more large narrow-band interfering signals. The decision logic is implemented by selecting the bin magnitudes that exceed the threshold as those bins that comprise narrow-band interfering signals.

The corrupted frequency bin number information is passed to frequency selectable band reject filters 357 in the signal channel 327. Here the corrupted frequency bin number information is used to select band reject filters that correspond in frequency to the corrupted frequency bins to excise the narrow-band interfering signals. A delay 355 may be connected between the digital down converter 220 and the frequency selectable band reject filter 357 to provide a delay to compensate for the processing delays in the detection channel 330.

Figure 4:
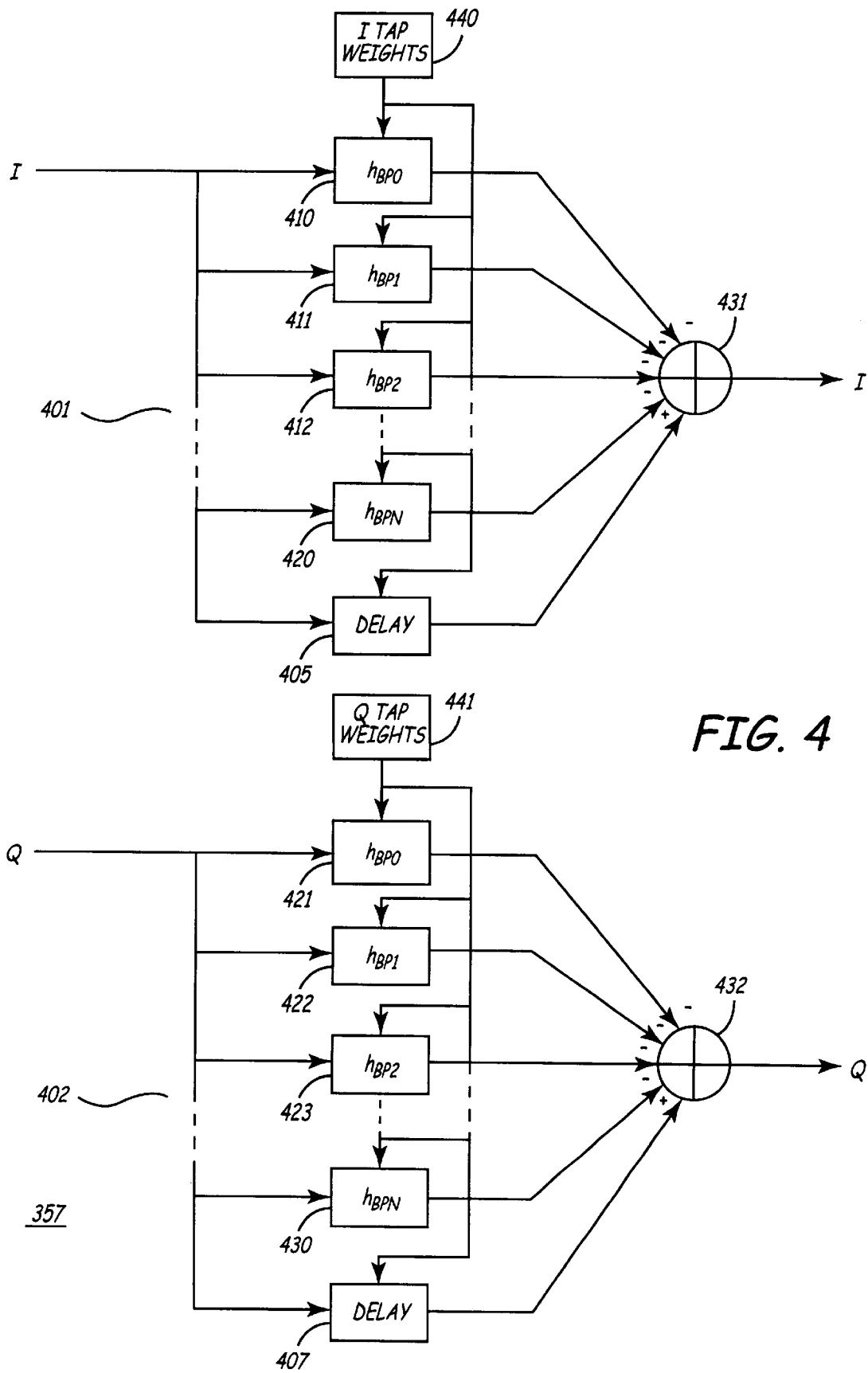
FIG. 4 is a block diagram of an example implementation of the narrow-band band-reject filter bank.

The frequency selectable band reject filters 357 are implemented as two banks of real digital filters (401, 402) shown in FIG. 4. One filter bank is for in-phase samples (401) and the other filter bank is for quadrature samples (402). Each filter in the filter bank uses a multi-stage decimator-interpolator architecture for efficiency of implementation. In this implementation, the narrow-band band-reject filter bank (401, 402) is implemented as a narrow-band band-pass filter bank with an associated delay line (405, 407). The time duration of the delay line (405, 407) is equal to one-half the impulse response period of the band-pass filter. The output of the band-pass filter bank is subtracted (431, 432) from the output of the delay line. This yields a narrow-band band-reject filter bank. The filter bank is formed, as shown in FIG. 4, by having multiple band-pass filters (410 through 430). If all of the band-pass filters (410 through 430) have an identical shape factor, then only a single delay line (405, 407) is needed for each real filter bank. Tap weights for all possible band-pass filters are precomputed and stored. Tap weight sets (440, 441) for particular center frequencies are retrieved from memory and loaded into the filter bank as needed.

The output of the frequency selectable band reject filter bank 357 is a filtered baseband signal containing the desired DSSS signal with the narrow-band interfering signals removed. The filtered baseband signal is then passed to the direct sequence demodulator 260 for demodulation to obtain the desired signal.

The DSSS narrow band excision function can be fully implemented in a single application specific circuit (ASIC). This will allow using the invention in small high-performance communications products.

It is believed that the narrow-band excision method used in a DSSS communications system receiver of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of excising one or more narrow-band interfering signals and obtaining a desired signal in a direct sequence spread spectrum communications receiver comprising:

receiving an input signal containing the one or more narrow-band interfering signals and a desired direct sequence spread spectrum signal;

maintaining a constant input signal level;

converting the input signal into a baseband signal;

performing a spectral analysis on the baseband signal to obtain spectral analysis output signals;

determining which spectral analysis output signals contain the one or more narrow-band interfering signals;

positioning band-reject filters to filter the baseband signal to excise the one or more narrow-band interfering signals according to the spectral analysis output signals determined to contain the one or more narrow-band interfering signals; and demodulating the desired direct sequence spread spectrum signal in the filtered baseband signal to obtain the desired signal.

2. The method of claim 1 wherein the step of maintaining a constant input signal further comprises:

generating an automatic gain control signal from lowest magnitude spectral analysis output signals; and controlling the input signal with the automatic gain control signal to maintain a constant input signal level.

3. The method of claim 1 wherein the step of converting the input signal into the baseband signal further comprises:

down converting the input signal to an IF signal;

digitizing the IF signal; and down converting the digitized IF signal into an I/Q baseband signal.

4. The method of claim 1 wherein the step of performing the spectral analysis on the baseband signal further comprises:

routing the baseband signal into a detection channel; and performing the spectral analysis in the detection channel on the baseband signal to obtain the spectral analysis output signals.

5. The method of claim 4 wherein the step of performing a spectral analysis on the baseband signal to obtain the spectral analysis output signals is performed in pseudo-real-time blocks of samples.

6. The method of claim 4 wherein the step of determining which spectral analysis output signals contain the one or more narrow-band interfering signals further comprises:

comparing magnitudes of the spectral analysis output signals to a threshold; and determining which spectral analysis output signals exceed the threshold indicating the presence of the one or more narrow-band interfering signals.

7. The method of claim 1 wherein the step of positioning the band-reject filters further comprises routing the baseband signal into a signal channel wherein the signal channel performs the step of positioning band-reject filters to excise the one or more narrow-band interfering signals from the signal channel according to the spectral analysis output signals indicating the one or more narrow-band interfering signals.

8. A method of excising one or more narrow-band interfering signals and obtaining a desired signal in a direct sequence spread spectrum communications receiver comprising:

receiving an input signal containing the one or more narrow-band interfering signals and a desired direct sequence spread spectrum signal;

controlling the input signal with an automatic gain control signal to maintain a constant input signal level;

down converting the input signal to an IF signal;

digitizing the IF signal;

down converting the digitized IF signal into an I/Q baseband signal;

routing the I/Q baseband signal into a detection channel wherein the detection channel performs the steps comprising:
  performing a spectral analysis on the I/Q baseband signal;
  detecting magnitudes of the I/Q baseband signal spectral analysis output signals in frequency bins;
  generating the automatic gain control signal from the lowest magnitude spectral analysis signals in the frequency bins;
  comparing the magnitudes of the spectral analysis output signals in the frequency bins to a threshold; and
  determining corrupted frequency bin numbers containing the one or more narrow-band interfering signals when the frequency bins contain signals that exceed the threshold;
routing the I/Q baseband signal into a signal channel wherein the signal channel performs the step of positioning frequency selectable band-reject filters to filter the I/Q baseband signal to excise the one or more narrow-band interfering signals from the signal channel signal according to the corrupted frequency bin numbers containing the one or more narrow-band interfering signals exceeding the threshold; and
demodulating the desired direct sequence spread spectrum signal in the filtered I/Q baseband signal to obtain the desired signal.

9. A direct sequence spread spectrum receiver comprising:
an antenna for receiving an input signal containing one or more narrow-band interfering signals and a desired direct sequence spread spectrum signal;
a down converter connected to the antenna for controlling the input signal level and down converting the input signal to a baseband signal;
a detection channel connected to the down converter for receiving the baseband signal said detection channel further comprising:
  a spectral analysis function for performing a spectral analysis on the baseband signal and generating spectral analysis output signals in frequency bins;
  a bin magnitude detector connected to the spectral analysis function for detecting magnitudes of the spectral analysis output signals in the frequency bins;
  an automatic gain control function connected to the bin magnitude detector for generating an AGC control signal from the lowest magnitude spectral analysis output signals in the frequency bins; and
  a decision logic function connected to the bin magnitude detector for comparing the magnitude of the spectral analysis output signals in the frequency bins to a threshold and for determining corrupted frequency bin numbers containing the one or more narrow-band interfering signals when the frequency bins contain signals exceeding the threshold;
a signal channel for receiving the baseband signal and for filtering the baseband signal to excise the one or more narrow-band interfering signals from the signal channel according to the spectral analysis output signals indicating the presence of one or more narrow-band interfering signals; and
a demodulator for demodulating the desired direct sequence spread spectrum signal contained in the baseband signal in the signal channel.

10. The direct sequence spread spectrum receiver of claim 9 wherein the down converter further comprises:

an AGC controller connected to the antenna for controlling the input signal level with the AGC control signal to maintain a constant input signal level;
a mixer for down converting the input signal received from the AGC controller to an IF signal;
an A/D converter for digitizing the IF signal received from the mixer; and
a digital down converter for down converting the IF signal into the baseband signal.

11. The direct sequence spread spectrum receiver of claim 9 wherein the signal channel further comprises frequency selectable band-reject filters to excise the one or more narrow-band interfering signals from the signal channel signal according to the corrupted frequency bin numbers.

12. The direct sequence spread spectrum receiver of claim 9 wherein the spectral analysis function is a magnitude spectral analysis.

13. A direct sequence spread spectrum communications receiver for excising one or more narrow-band interfering signals and receiving a desired signal comprising:
an antenna for receiving an input signal containing the one or more narrow-band interfering signals and the desired signal;
an AGC controller connected to the antenna for controlling the input signal with an AGC control signal to maintain a constant input signal level;
a mixer for down converting the input signal received from the AGC controller to an IF signal;
an A/D converter for digitizing the IF signal received from the mixer;
a digital down converter for down converting the digitized IF signal into an I/Q baseband signal;
a detection channel connected to the digital down converter for receiving the I/Q baseband signal wherein the detection channel further comprises:
  a spectral analysis function for performing a spectral analysis on the I/Q baseband signal and generating spectral analysis output signals in frequency bins;
  a bin magnitude detector connected to the spectral analysis function for detecting magnitudes of the I/Q baseband signal spectral analysis output signals in the frequency bins;
  an automatic gain control function connected to the bin magnitude detector for generating the automatic gain control signal from the lowest magnitude I/Q baseband spectral analysis output signals in the frequency bins; and
  a decision logic function connected to the bin magnitude detector for comparing the magnitude of the I/Q baseband signal spectral analysis output signals in the frequency bins to a threshold and for determining corrupted frequency bin numbers containing the one or more narrow-band interfering signals when the frequency bins contain signals exceeding the threshold;
a signal channel for receiving the I/Q baseband signal wherein the signal channel further comprises frequency selectable band-reject filters to excise the one or more narrow-band interfering signals from the signal channel signal according to the corrupted frequency bin numbers; and
a demodulator for demodulating the I/Q baseband signal in the signal channel to obtain the desired signal.

* * * * *